(12) United States Patent
Huang (10) Patent No.: US 11,793,618 B1
(45) Date of Patent: Oct. 24, 2023

(54) ELECTRIC TOOTHBRUSH HEAD

(71) Applicant: SHENZHEN E-WORLD TECHNOLOGY LIMITED, Guangdong (CN)

(72) Inventor: Xiangyu Huang, Guangdong (CN)

( * ) Notice: Subject to any disclaimer, the term of this patent is extended or adjusted under 35 U.S.C. 154(b) by 0 days.

(21) Appl. No.: 18/138,134

(22) Filed: Apr. 24, 2023

(51) Int. Cl.
*A61C 17/22* (2006.01)
*A61C 17/34* (2006.01)
*A46B 13/02* (2006.01)
*A46B 5/00* (2006.01)

(52) U.S. Cl.
CPC .......... *A61C 17/222* (2013.01); *A46B 5/0095* (2013.01); *A46B 13/023* (2013.01); *A61C 17/225* (2013.01); *A61C 17/3481* (2013.01)

(58) Field of Classification Search
CPC ... A61C 17/3481; A61C 17/222; A61C 17/34; A61C 17/225; A46B 13/023; A46B 8/23; A46B 5/0095
See application file for complete search history.

(56) References Cited

U.S. PATENT DOCUMENTS

| 11,311,096 | B2 * | 4/2022 | Wagner | ................ | A61C 17/222 |
| 2008/0250583 | A1 * | 10/2008 | Green | ................ | A61C 17/3418 15/22.2 |

FOREIGN PATENT DOCUMENTS

CN 110680535 A * 1/2020 ............. A61C 17/34

* cited by examiner

*Primary Examiner* — Laura C Guidotti (57) ABSTRACT

Provided is an electric toothbrush head including a brush body and an inserting block. A receiving cavity is provided in a lower part of the brush body and is inserted by the inserting block; the inserting block is provide internally with a machine core channel into which a vibrating-machine core is inserted; a pin is provided in the brush body, is inserted in an upper part of the inserting block, and fixedly connects the upper part of the inserting block with the brush body; a bottom abutment ring is formed on a bottom of the inserting block and is located below the brush body; the upper part of the inserting block is in fixed connection with the brush body via the pin, and the bottom of the inserting block abuts against the bottom of the brush body via the bottom abutment ring.

9 Claims, 10 Drawing Sheets

ELECTRIC TOOTHBRUSH HEAD

TECHNICAL FIELD

The present patent relates to the technical field of toothbrush heads, and in particular to electric toothbrush heads.

DESCRIPTION OF THE PRIOR ART

As the quality of life continues to increase, electric toothbrushes have been heavily marketed, rapid rotation or vibration of a vibrating machine core makes the toothbrush head create vibrations with high frequency, such that the toothpaste is momentarily broken down into fine foam to clean the interdental spaces, and at the same time, flutter of the bristles can promote blood circulation of the oral cavity and have a massaging effect on the gum tissues.

The electric toothbrush includes a handle and an electric toothbrush head, a top of the handle is provided with a vibrating machine core, the electric toothbrush head includes a brush body and a inserting block, bristles are provided on the brush body, the inserting block is inserted in the brush body, a machine core channel is provided in the inserting block, the vibrating machine core is inserted in the machine core channel, the vibrating machine core abuts against the machine core channel, high frequency vibrations generated by the vibrating machine core drive the bristles on the electric toothbrush head to vibrate, in order to make the bristles brush teeth.

The inserting block is inserted in the brush body, and requires a fixed connection to the brush body, to avoid disengagement between the inserting block and the brush body during use. In the prior art, in order to achieve the assembly between the inserting block and the brush body, it is often necessary to provide a plurality of engagement structures between the inserting block and the brush body, so that not only the structure is complicated, but also the connection via the engagement structures suffers from unstable connection.

SUMMARY OF THE DISCLOSURE

An object of the present disclosure is to provide an electric toothbrush head intended to solve the problems of the prior art that the electric toothbrush heads are structurally complex.

The present disclosure is implemented by an electric toothbrush head including a brush body and an inserting block, wherein an upper part of the brush body is provide with a bristle section on which bristles are provided, a lower part of the brush body is provided with a receiving cavity, the receiving cavity forms a mounting opening on a bottom of the brush body, the inserting block is inserted into the receiving cavity through the mounting opening, an outer sidewall of the inserting block abuts against an inner sidewall of the receiving cavity; the inserting block is provide internally with a machine core channel into which a flat vibrating machine core is inserted, the machine core channel forms an insertion opening on the bottom of the inserting block, the vibrating machine core is inserted into the machine core channel through the insertion opening and abuts against an inner sidewall of the machine core channel; the brush body is provided internally with a pin which is transversely arranged and is penetrated into the receiving cavity, and is inserted in an upper part of the inserting block, the pin fixedly connects the upper part of the inserting block with the brush body; an outer periphery of a bottom of the inserting block extends outwardly to form a bottom abutment ring, the bottom abutment ring is disposed circumferentially along the outer periphery of the inserting block, the bottom abutment ring is located below the brush body and abuts against the bottom of the brush body from bottom up.

Further, the brush body is provided internally with a mounting hole which is transversely arranged and communicates with the receiving cavity, the pin is inserted into the mounting hole, an inner end of the pin passes through the mounting hole and extends into the receiving cavity to be inserted into the upper part of the inserting block; a longitudinal step which is longitudinally arranged is formed in a middle of the mounting hole, an outer end of the pin is provided with a tip, the tip is embedded and fixed in the mounting hole, the tip abuts against the longitudinal step, the longitudinal step limits a lateral insertion depth of the pin.

Further, a middle of the inserting block is provide with a notched slot, the notched slot communicates with the machine core channel, a resilient arm which is longitudinally arranged is provided in the notched slot and abuts against the inner sidewall of the receiving cavity; when the vibrating machine core is inserted into the machine core channel, the vibrating machine core abuts against the inner sidewall of the machine core channel, and the resilient arm abuts against the vibrating machine core.

Further, the inserting block includes a seat body and a insertion shaft disposed on the seat body; the insertion shaft abuts on a top of the seat body, the seat body is integrally formed with the insertion shaft; the machine core channel passes through the seat body and extends to a lower part of the insertion shaft; the notched slot is provided on the insertion shaft and the bottom abutment ring is provided on an outer periphery of a bottom of the seat body; the insertion shaft and the seat body are inserted in the receiving cavity, respectively, an outer sidewall of the insertion shaft and an outer sidewall of the seat body abut against the inner sidewall of the receiving cavity; an upper part of the insertion shaft is solid to form a securing section, an outer sidewall of the securing section abuts against the inner sidewall of the receiving cavity; a pin hole which is transversely arranged is provided in the securing section, the pin hole is laterally aligned with the mounting hole, the pin is inserted and fixed in the pin hole.

Further, an outer periphery of the securing section is provided with a positioning surface which is longitudinally arranged, the positioning surface is planar; the inner sidewall of the receiving cavity includes a positioning sidewall which is longitudinally arranged, the positioning sidewall is planar, the positioning surface abuts against the positioning sidewall; the pin passes through the positioning sidewall and the positioning surface, respectively.

Further, a lower part of the insertion shaft forms a vibration section, the machine core channel extends into the vibration section, the notched slot is provided in the vibration section; a vibration gap is provide between an outer sidewall of the vibration section and the inner sidewall of the receiving cavity; the seat body includes a peripheral sidewall which is arranged outwardly, along the direction that the seat body is inserted into the receiving cavity, the peripheral sidewall is inclined inwardly and abuts against the inner sidewall of the receiving cavity.

Further, an upper end of the resilient arm is connected to an inner sidewall of the notched slot, a lower end of the resilient arm extends into the notched slot and is freely arranged; the resilient arm includes an inner abutment surface facing the machine core channel and an outer abutment surface facing away from the machine core channel, the inner abutment surface abuts against the vibrating machine core, the outer abutment surface abuts against the inner sidewall of the receiving cavity; a transverse groove which is transversely arranged is formed on the vibrating machine core, and the inner abutment surface is convexly provided with a transverse rib which is transversely arranged, the transverse rib is embedded in the transverse groove.

Further, an upper part of the outer abutment surface is recessed towards the machine core channel to form a recess portion, and a lower part of the outer abutment surface is protruded outwardly to form a protruding portion; an upper part of the resilient arm has a thickness less than the thickness of the lower part of the resilient arm, the protruding portion abuts against the inner sidewall of the receiving cavity, a resilient gap is provided between the recess portion and the inner side-wall of the receiving cavity.

Further, a middle of the resilient arm is provided with a interlayer groove which is longitudinally arranged and extends through the lower end of the resilient arm; the interlayer groove is filled with an elastic glue layer, the glue layer fills the entire interlayer groove, the glue layer is in a stressed state in the interlayer groove; the glue layer passes through the resilient arm and extends to the inner abutment surface, to form a resilient surface protruding out of the inner abutment surface; the glue layer is internally provided with a plurality of hollows, and the resilient surface abuts against the vibrating machine core when the vibrating machine core is inserted into the machine core channel, the resilient surface is compressed inwardly to be flush with the inner abutment surface.

Further, a mounting gap is provided between an end portion of the pin and an end portion of the pin hole, a plurality of resilient rings are embedded in an outer sidewall of the pin, the plurality of resilient rings are arranged at intervals along an axial direction of the pin, and are circumferentially arranged along a circumferential direction of the pin; a plurality of mounting grooves are provided in the pin, the plurality of mounting grooves are arranged at intervals along the axial direction of the pin, and are circumferentially arranged along the circumferential direction of the pin; each of the resilient rings is embedded in one mounting groove, a bottom of the resilient ring abuts against a bottom of the mounting groove, and a top of the resilient ring extends out of the mounting groove; a deformation gap is provided between each of two sides of the resilient ring and an inner sidewall of the mounting groove, a middle of the resilient ring is provided with a hollowed groove, the hollowed groove is circumferentially arranged along a circumferential direction of the resilient ring, the hollowed groove extends through the top of the resilient ring; when the pin is inserted into the brush body and the inserting block, the resilient rings are compressed and generate elastic compression deformation towards the deformation gaps and the hollowed groove, the resilient rings are in a stressed state.

In contrast to the prior art, the present disclosure provides an electric toothbrush head, the vibrating machine core is inserted in the machine core channel and abuts against the inner sidewall of the machine core channel, and high frequency vibrations of the vibrating machine core can be transmitted to the brush body via the inserting block, such that the bristles on the brush body are driven to vibrate with high frequency; the upper part of the inserting block is fixedly connected with the brush body via the pin, the bottom of the inserting block abuts against the bottom of the brush body from bottom up by means of the bottom abutment ring, thereby resulting in a mounting connection between the inserting block and the brush body, which is structurally simple, and the connection between the inserting block and the brush body is achieved by means of the pin, which is more robust, thereby avoiding disengagement between the inserting block and the brush body during long vibration work.

DESCRIPTION OF EMBODIMENTS

In order that the objects, technical solutions and advantages of the present disclosure will become more apparent, the present disclosure will now be described in further detail below with reference to the accompanying drawings and examples. It should be understood that the specific embodiments described herein are merely illustrative of the disclosure and are not intended to limit the disclosure.

The following detailed description of implementations of the disclosure refers to specific embodiments.

Like or similar reference numerals in the drawings of the present embodiments correspond to like or similar components; in the description of the disclosure, it needs to be understood that the terms "upper", "lower", "left", "right", etc., indicate an orientation or positional relationship based on the orientation or positional relationship shown in the drawings, merely for ease of description of the disclosure and simplification of the description, rather than instructing or implying that the device or element referred to must have a particular orientation, be constructed and operated in a particular orientation, accordingly, the terms in the drawings that depict positional relationships are for illustrative purposes only and are not to be construed as limiting the present disclosure, and the specific meanings of such terms can be understood by those of ordinary skill in the art from a particular situation.

Referring to FIGS. 1-12, preferred embodiments of the present disclosure are provided.

Figure 12:
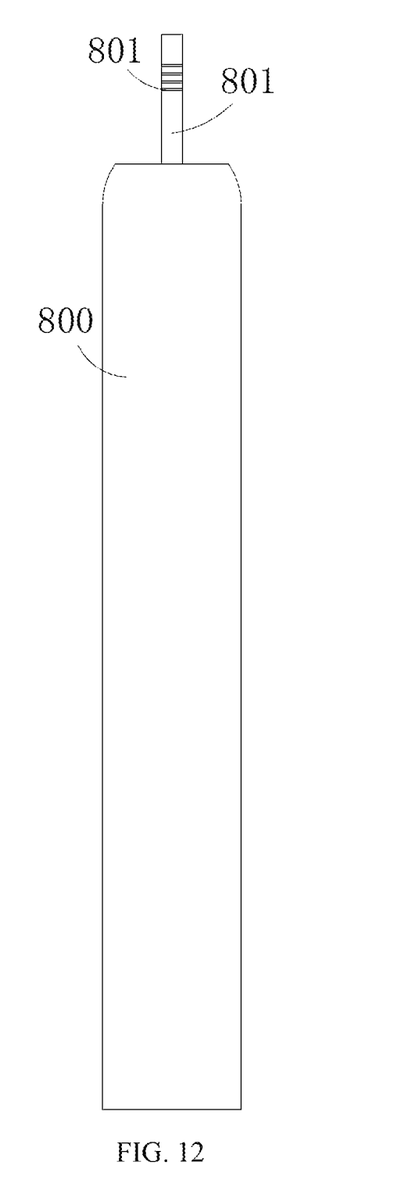
FIG. 12 is a schematic front view of a handle 800 according to the present disclosure.

The present embodiment provides an electric toothbrush head configured to be coupled to a vibrating machine core 801 of the handle 800, the vibrating machine core 801 is inserted in a machine core channel 34 of the electric toothbrush head and is secured within the machine core channel 34, and the vibrating machine core 801 vibrates with high frequency to drive the entire electric toothbrush head to vibrate, thereby achieving high frequency vibration of the bristles.

Figure 1:
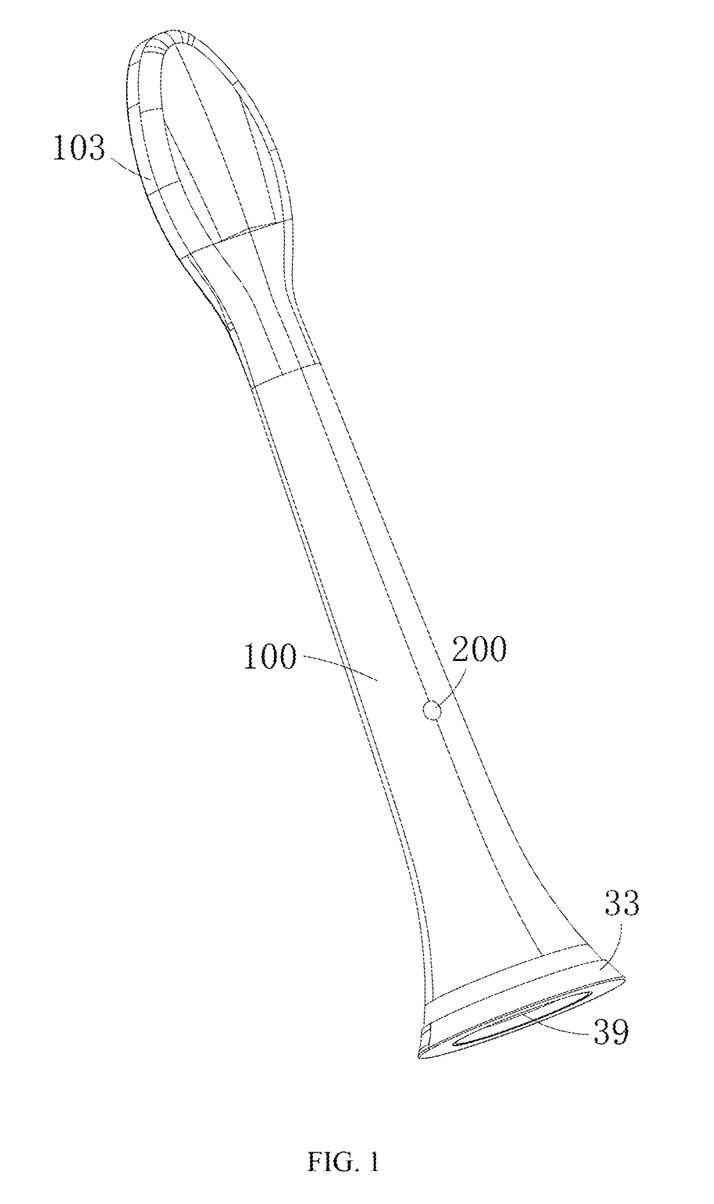
FIG. 1 is a schematic perspective view of an electric toothbrush head according to the present disclosure.
Figure 2:
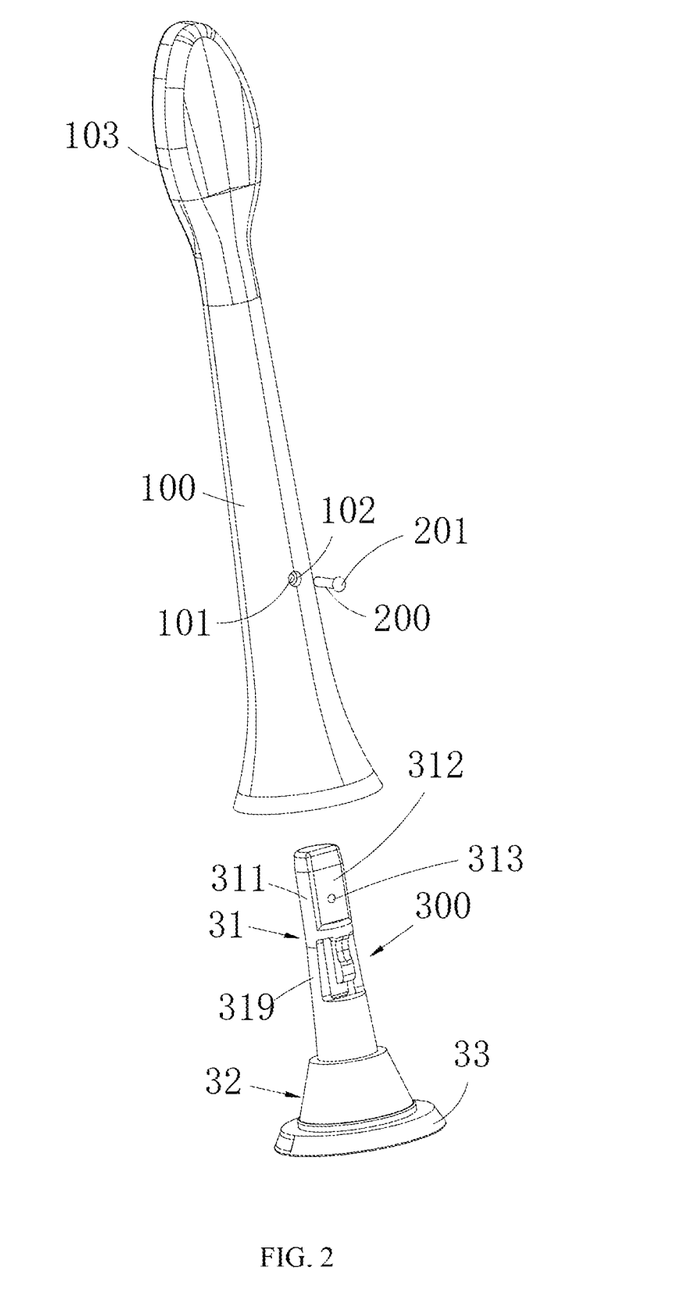
FIG. 2 is a schematic exploded perspective view of an electric toothbrush head according to the present disclosure.
Figure 4:
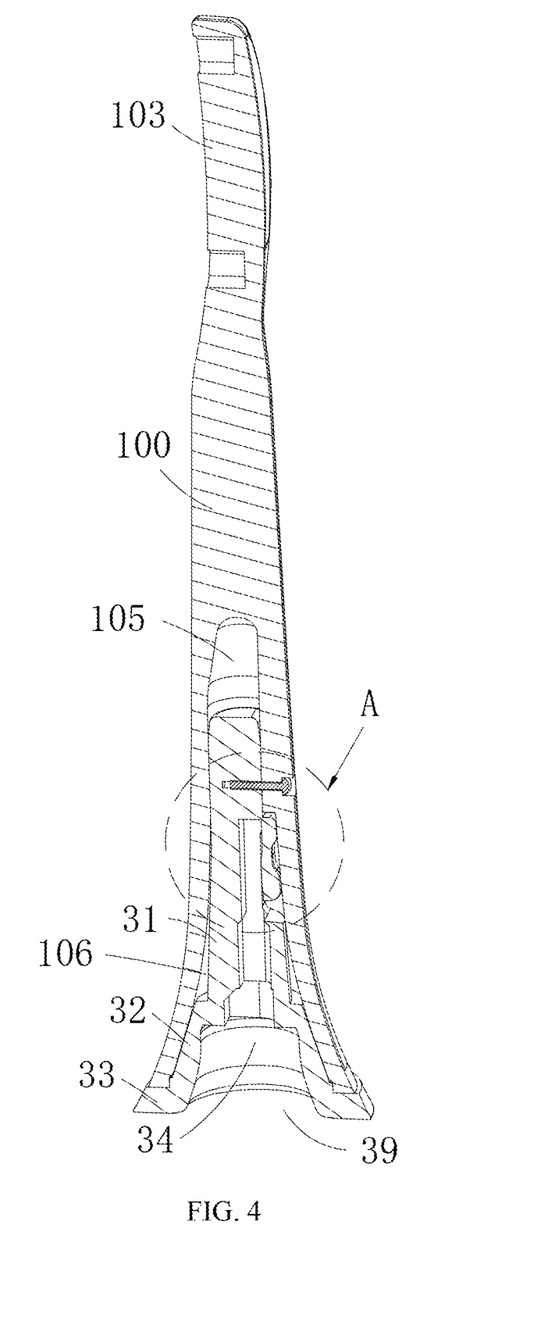
FIG. 4 is a schematic cross-section view of an electric toothbrush head according to the present disclosure.

An electric toothbrush head whose connection is achieved through a pin 200, includes a brush body 100 and an inserting block 300, wherein an upper part of the brush body 100 is provide with a bristle section 103 on which bristles are provided, a lower part of the brush body 100 is provided with a receiving cavity 105, the receiving cavity 105 forms a mounting opening 109 on a bottom of the brush body 100, the inserting block 300 is inserted into the receiving cavity 105 through the mounting opening, an outer sidewall of the inserting block 300 abuts against an inner sidewall of the receiving cavity 105; the inserting block 300 is provide internally with a machine core channel 34 into which a flat vibrating machine core 801 is inserted, the machine core channel 34 forms an insertion opening 39 on the bottom of the inserting block 300, the vibrating machine core 801 is inserted into the machine core channel 34 through the insertion opening 39 and abuts against an inner sidewall of the machine core channel 34.

The brush body 100 is provided internally with the pin 200 which is transversely arranged and is penetrated into the receiving cavity 105, and is inserted in an upper part of the inserting block 300, the pin 200 fixedly connects the upper part of the inserting block 300 with the brush body 100; an outer periphery of a bottom of the inserting block 300 extends outwardly to form a bottom abutment ring 33, the bottom abutment ring 33 is disposed circumferentially along the outer periphery of the inserting block 300, the bottom abutment ring 33 is located below the brush body 100 and abuts against the bottom of the brush body 100 from bottom up.

For the electric toothbrush head as described above, the vibrating machine core 801 is inserted in the machine core channel 34 and abuts against the inner sidewall of the machine core channel 34, and high frequency vibrations of the vibrating machine core 801 can be transmitted to the brush body 100 via the inserting block 300, such that the bristles on the brush body 100 are driven to vibrate with high frequency; the upper part of the inserting block 300 is fixedly connected with the brush body 100 via the pin 200, the bottom of the inserting block 300 abuts against the bottom of the brush body 100 from bottom up by means of the bottom abutment ring 33, thereby resulting in a mounting connection between the inserting block 300 and the brush body 100, which is structurally simple, and the connection between the inserting block 300 and the brush body 100 is achieved by means of the pin 200, which is more robust, thereby avoiding disengagement between the inserting block 300 and the brush body 100 during long vibration work.

Figure 5:
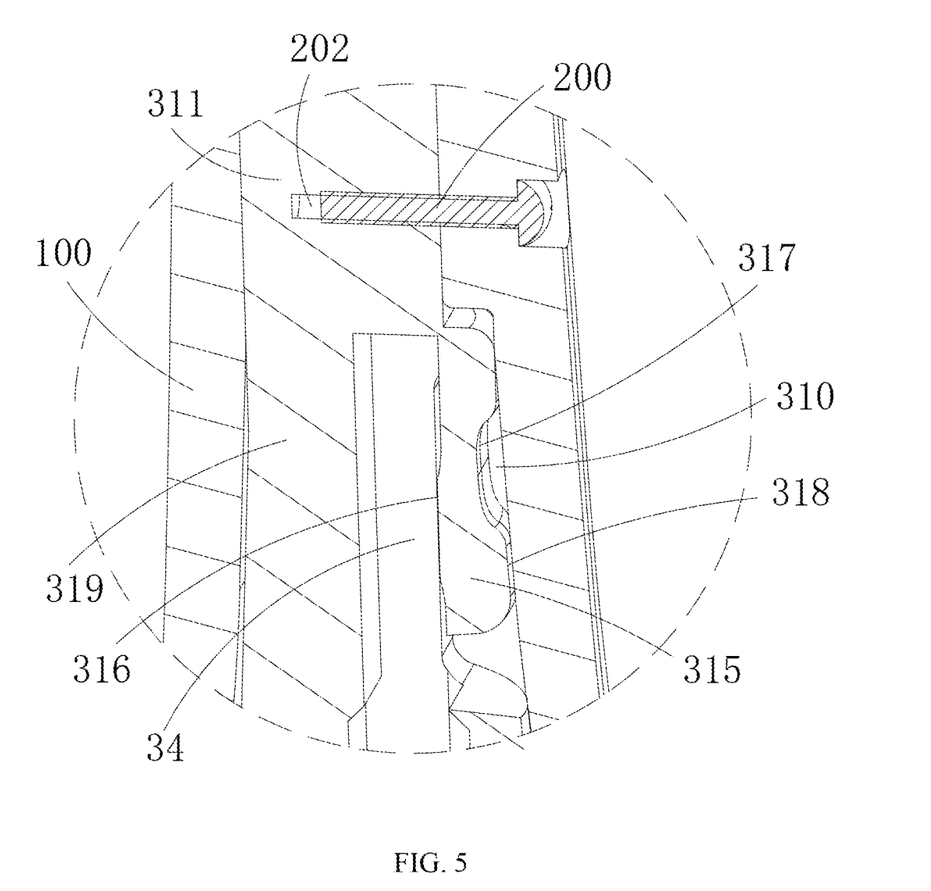
FIG. 5 is an enlarged schematic view at A in FIG. 4.
Figure 6:
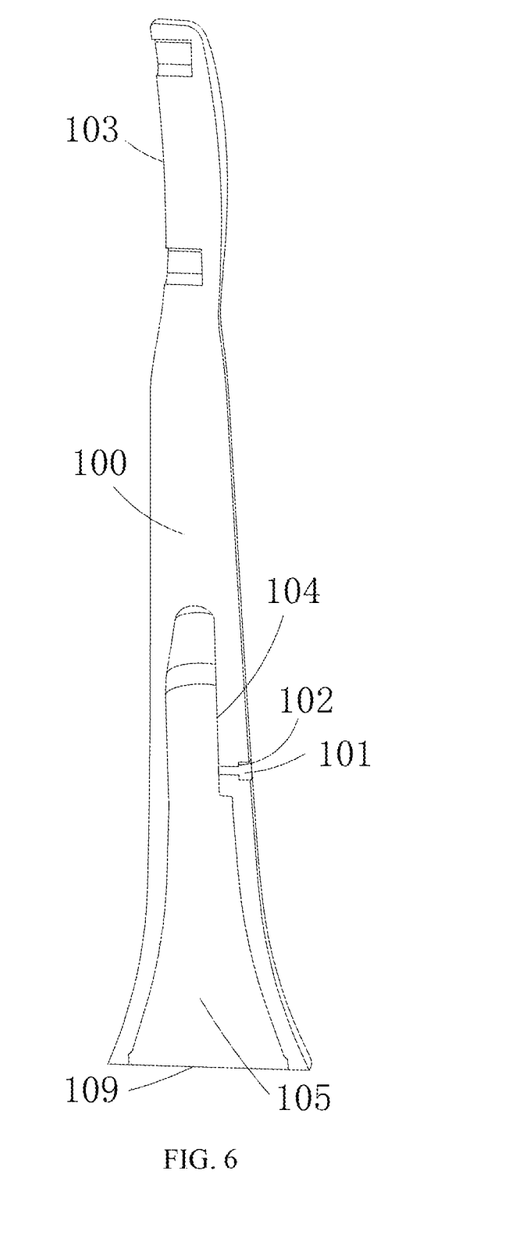
FIG. 6 is an internal schematic view of a brush body according to the present disclosure.

In this embodiment, the brush body 100 is provided internally with a mounting hole 101 which is transversely arranged and communicates with the receiving cavity 105, the pin 200 is inserted into the mounting hole 101, an inner end of the pin 200 passes through the mounting hole 101 and extends into the receiving cavity 105 to be inserted into the upper part of the inserting block 300; a longitudinal step 102 which is longitudinally arranged is formed in a middle of the mounting hole 10, an outer end of the pin 200 is provided with a tip 201, the tip 201 is embedded and fixed in the mounting hole 101, the tip 201 abuts against the longitudinal step 102, the longitudinal step 102 limits a lateral insertion depth of the pin 200.

The longitudinal step 102 may limit the lateral insertion depth of the pin 200 as insertion of the pin 200 is performed, thereby simplifying the installation as well as allowing the pin 200 to be inserted into place.

The tip 201 has an outer end surface facing outwardly, the outer end surface of the tip 201 is exposed to an outside of the mounting hole 101 and is flush with an outer surface of the brush body 100, such that the entire outer surface of the brush body 100 is integrated without forming an uneven structure due to an outer surface of the tip 201.

Figure 3:
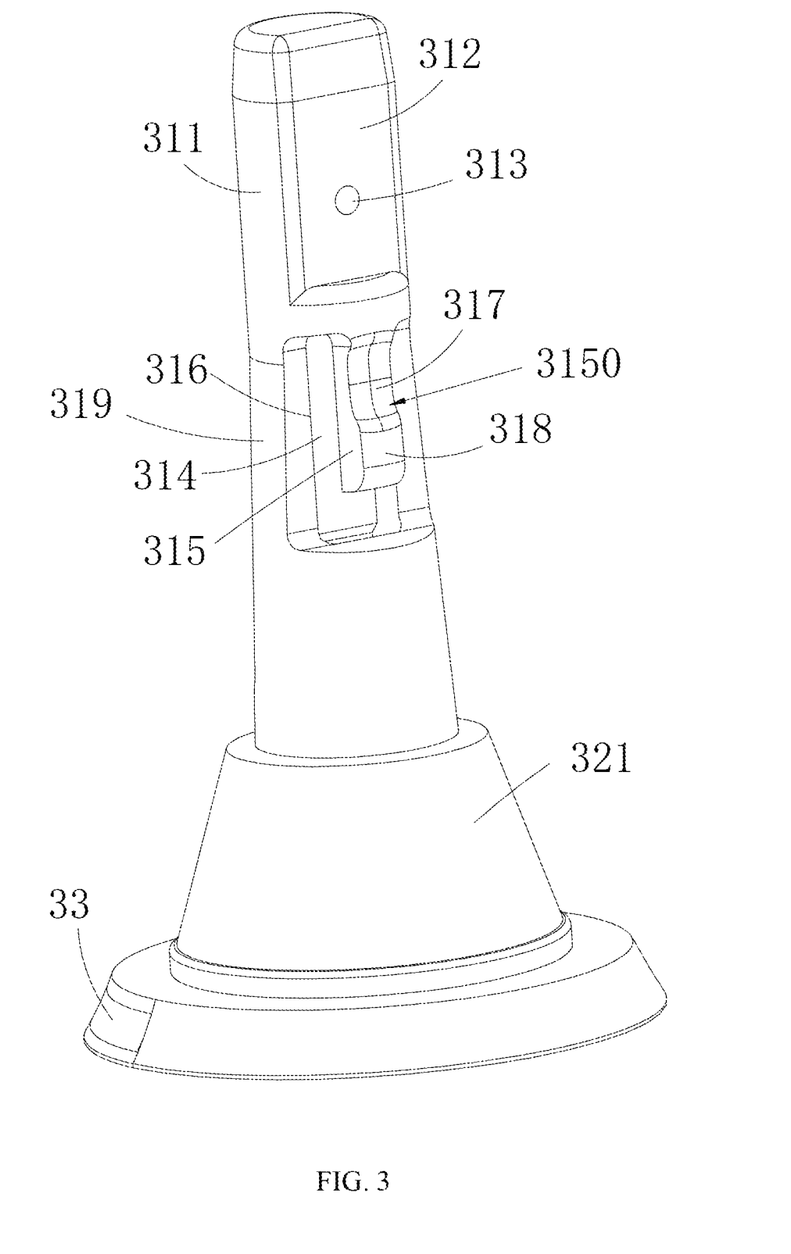
FIG. 3 is a schematic perspective view of an inserting block according to the present disclosure.

A middle of the inserting block 300 is provide with a notched slot 314, the notched slot 314 communicates with the machine core channel 34, a resilient arm 315 which is longitudinally arranged is provided in the notched slot 314 and abuts against the inner sidewall of the receiving cavity 105; when the vibrating machine core 801 is inserted into the machine core channel 34, the vibrating machine core 801 abuts against the inner sidewall of the machine core channel 34, and the resilient arm 315 abuts against the vibrating machine core 801.

The vibrating machine core 801 is inserted in the machine core channel 34 and abuts against the resilient arm 315, and the high frequency vibration of the vibrating machine core 801 may be transmitted to the brush body 100 via the inserting block 300 and the resilient arm 315, such that the bristles on the brush body 100 are driven to vibrate with high frequency.

The inserting block 300 includes a seat body 32 and a insertion shaft 31 disposed on the seat body; the insertion shaft 31 abuts on a top of the seat body 32, the seat body 32 is integrally formed with the insertion shaft 31; the machine core channel 34 passes through the seat body 32 and extends to a lower part of the insertion shaft 31; the notched slot 314 is provided on the insertion shaft 31 and the bottom abutment ring 33 is provided on an outer periphery of a bottom of the seat body 32.

The insertion shaft 31 and the seat body 32 are inserted in the receiving cavity 105, respectively, an outer sidewall of the insertion shaft 31 and an outer sidewall of the seat body 32 abut against the inner sidewall of the receiving cavity 105; an upper part of the insertion shaft 31 is solid to form a securing section 311, an outer sidewall of the securing section 311 abuts against the inner sidewall of the receiving cavity 105; a pin hole 313 which is transversely arranged is provided in the securing section 311, the pin hole 313 is laterally aligned with the mounting hole 101, the pin 200 is inserted and fixed in the pin hole 313.

The pin holes 313 is provided in the securing section 311 being solid, which facilitates the arrangement of the pin hole 313 and also makes the connection between the pin 200 and the fixing section 311 more secure after insertion of the pin 200 into the pin holes 313.

An outer periphery of the securing section 311 is provided with a positioning surface 312 which is longitudinally arranged, the positioning surface 312 is planar; the inner sidewall of the receiving cavity 105 includes a positioning sidewall 316 which is longitudinally arranged, the positioning sidewall 316 is planar, the positioning surface 312 abuts against the positioning sidewall 316; the pin passes through the positioning sidewall 316 and the positioning surface 312, respectively.

During insertion of the inserting block 300 into the receiving cavity 105, the inserting block 300 may be properly assembled in the receiving cavity 105 only when the positioning surface 312 faces the positioning sidewall 316, else the inserting block 300 cannot be properly assembled in the receiving cavity 105.

A lower part of the insertion shaft 31 forms a vibration section 319, the machine core channel 34 extends into the vibration section 319, the notched slot 314 is provided in the vibration section 319; a vibration gap 106 is provide between an outer sidewall of the vibration section 319 and the inner sidewall of the receiving cavity 105. The securing section 311 is in fixed connection with the brush body 100 via the pin 200, and when the vibrating machine core 801 vibrates in the machine core channel 34, the vibrations are transmitted to the insertion shaft 31 and thus to the brush body 100, thereby causing the vibration of the brush body 100, and due to the vibration gap 106 between the vibration section 319 and the inner sidewall of the receiving cavity 105, the vibration section 319 has sufficient elastic deformation space during vibrations, which facilitates the transmission of the vibrations.

In the present embodiment, the seat body 32 includes a peripheral sidewall 321 which is arranged outwardly, along the direction that the seat body 32 is inserted into the receiving cavity 105, the peripheral sidewall 321 is inclined inwardly and abuts against the inner sidewall of the receiving cavity 105. In this way, the insertion of the seat body 32 in the receiving cavity 105 is facilitated and the abutment of the peripheral sidewall 321 with the inner sidewall of the receiving cavity 105 is also facilitated.

Figure 11:
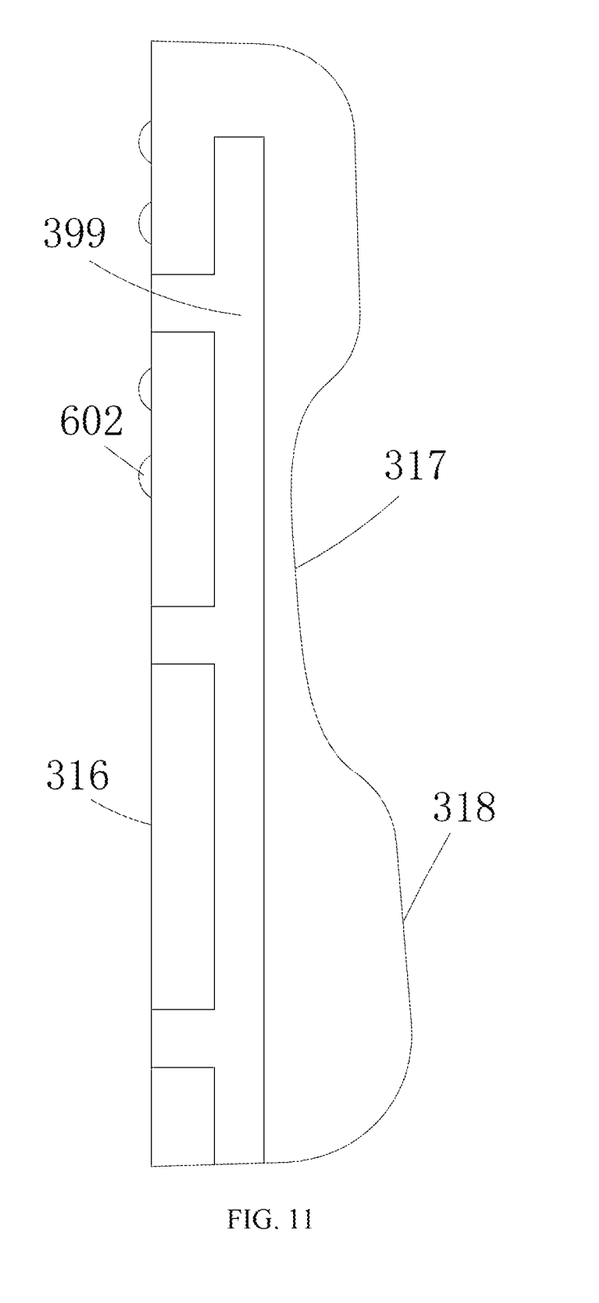
FIG. 11 is an internal schematic view of a resilient arm according to the present disclosure.

An upper end of the resilient arm 315 is connected to an inner sidewall of the notched slot 314, a lower end of the resilient arm 315 extends into the notched slot 314 and is freely arranged; the resilient arm 315 includes an inner abutment surface 316 facing the machine core channel 34 and an outer abutment surface 3150 facing away from the machine core channel 34, the inner abutment surface 316 abuts against the vibrating machine core 801, the outer abutment surface 3150 abuts against the inner sidewall of the receiving cavity 105; a transverse groove 802 which is transversely arranged is formed on the vibrating machine core 801, and the inner abutment surface 316 is convexly provided with a transverse rib 602 which is transversely arranged, the transverse rib 602 is embedded in the transverse groove 802.

By embedding the transverse rib 602 in the transversal groove of the vibrating machine core 801, a contact connection between the vibrating machine core 801 and the inner abutment surfaces 316 of the resilient aims 315 is made more robust, and a better transmission of vibrations between the vibrating machine core 801 and the resilient arms 315 is possible, and disengagement and misalignment between the vibrating machine core 801 and the inner abutment surface 316 of the resilient arms 315 are avoided during the transmission of vibrations.

In this embodiment, an upper part of the outer abutment surface 3150 is recessed towards the machine core channel 34 to form a recess portion 317, and a lower part of the outer abutment surface 3150 is protruded outwardly to form a protruding portion 318; an upper part of the resilient arm 315 has a thickness less than the thickness of the lower part of the resilient arm 315, the protruding portion 318 abuts against the inner sidewall of the receiving cavity 105, a resilient gap 310 is provided between the recess portion 317 and the inner sidewall of the receiving cavity 105.

When the elastic arm 315 is vibrated by the vibrating machine core 801, the elastic arm 315 is swung with the upper end thereof as the swing center, and the elastic gap 310 is provided between the recess portion 317 and the inner sidewall of the inserting block 105, which facilitates the elastic deformation of the upper part of the elastic arm 315.

Figure 10:
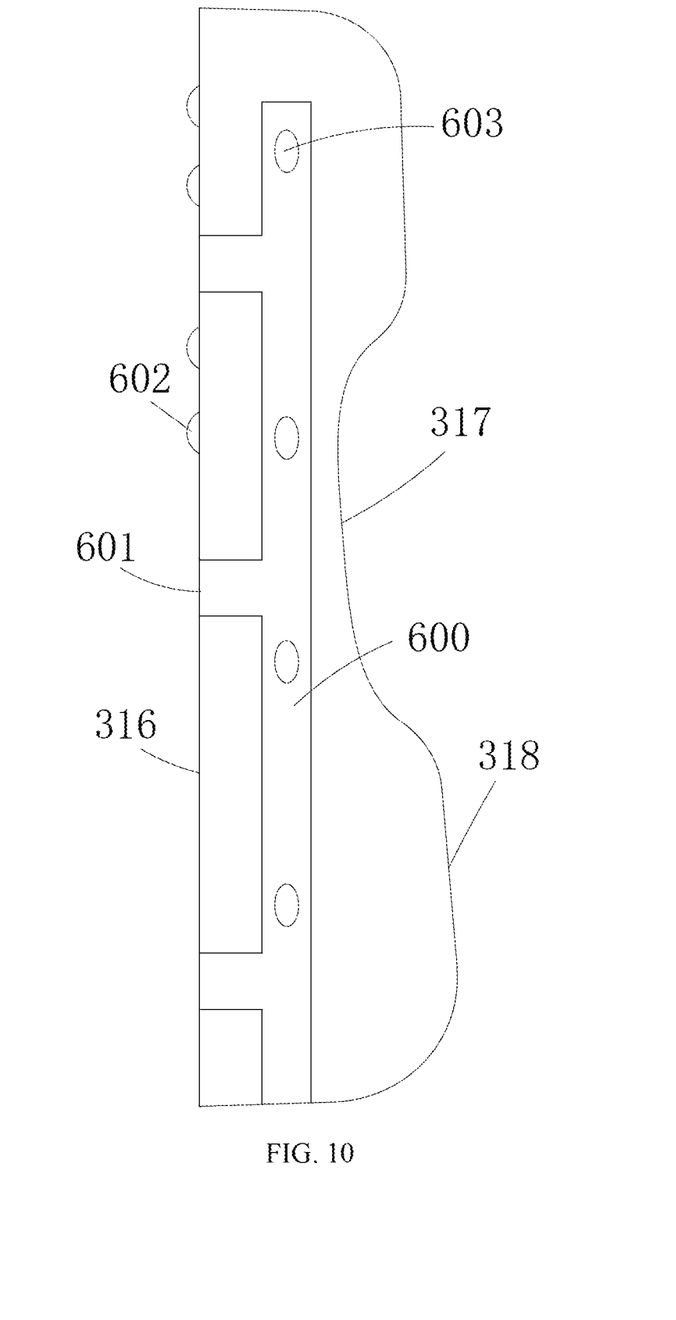
FIG. 10 is an internal schematic view of a resilient arm in cooperation with a glue layer according to the present disclosure.

In this embodiment, a middle of the resilient arm 315 is provided with a interlayer groove 399 which is longitudinally arranged and extends through the lower end of the resilient arm 315; the interlayer groove 399 is filled with an elastic glue layer 600, the glue layer 600 fills the entire interlayer groove 399, the glue layer 600 is in a stressed state in the interlayer groove 399; by providing the glue layer 600, a better resilient effect of the entire resilient arm 315 can be obtained, and the glue layer 600 is in a stressed state in the interlayer groove 399, which allows a better transmission of the vibrations of the vibrating machine core 801.

The glue layer 600 passes through the resilient arm 315 and extends to the inner abutment surface 316, to form a resilient surface 601 protruding out of the inner abutment surface 316; the glue layer 600 is internally provided with a plurality of hollows 603, and the resilient surface 601 abuts against the vibrating machine core 801 when the vibrating machine core 801 is inserted into the machine core channel 34, the resilient surface 601 is compressed inwardly to be flush with the inner abutment surface. By increasing the abutment of the resilient surface 601 against the vibrating machine core 801, the abutment of the resilient arm 315 directly against the vibrating machine core 801 can be made more resilient and robust; by providing a plurality of hollows 603, elastic deformation of the glue layer 600 can be enhanced.

Figure 7:
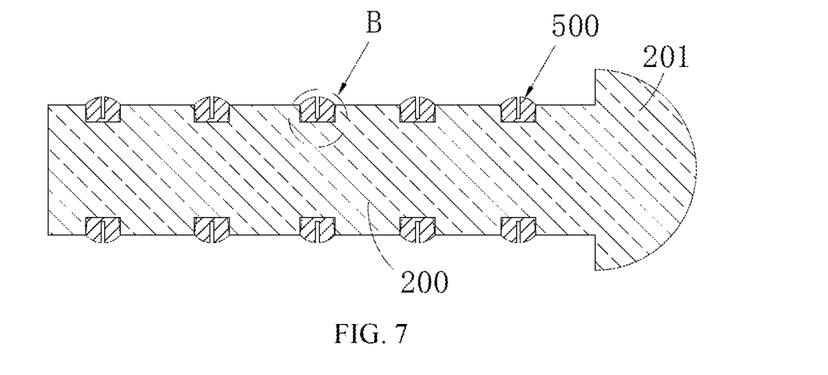
FIG. 7 is a cross-section schematic view of a pin in cooperation with a resilient ring according to the present disclosure.

In this embodiment, a mounting gap 202 is provided between an end portion of the pin 200 and an end portion of the pin hole 313, a plurality of resilient rings 500 are embedded in an outer sidewall of the pin 200, the plurality of resilient rings 500 are arranged at intervals along an axial direction of the pin 200, and are circumferentially arranged along a circumferential direction of the pin 200.

Figure 8:
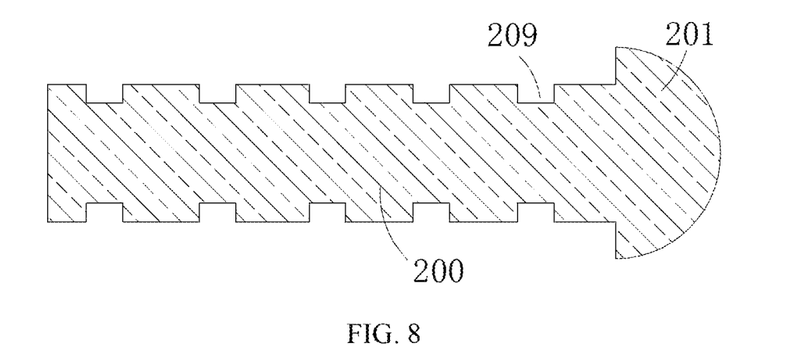
FIG. 8 is a cross-sectional schematic view of a pin according to the present disclosure.
Figure 9:
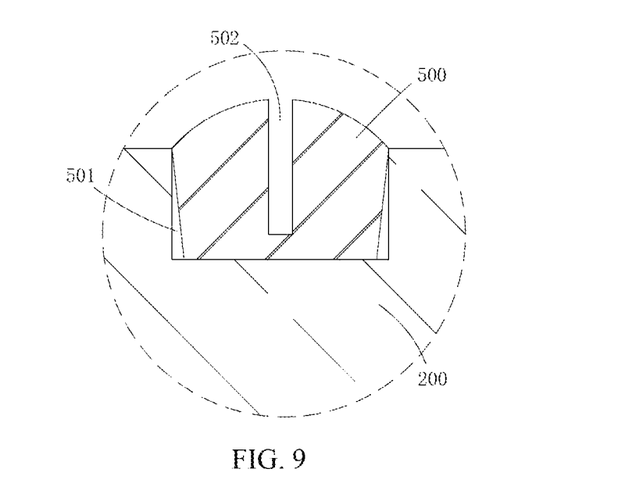
FIG. 9 is an enlarged schematic view at B in FIG. 7.

A plurality of mounting grooves 209 are provided in the pin 200, the plurality of mounting grooves 209 are arranged at intervals along the axial direction of the pin 200, and are circumferentially arranged along the circumferential direction of the pin 200; each of the resilient rings 500 is embedded in one mounting groove 209, a bottom of the resilient ring 500 abuts against a bottom of the mounting groove 209, and a top of the resilient ring 500 extends out of the mounting groove 209; a deformation gap 501 is provided between each of two sides of the resilient ring 500 and an inner sidewall of the mounting groove 209, a middle of the resilient ring 500 is provided with a hollowed groove 502, the hollowed groove 502 is circumferentially arranged along a circumferential direction of the resilient ring 500, the hollowed groove 502 extends through the top of the resilient ring 500.

When the pin 200 is inserted into the brush body 100 and the inserting block 300, each of the resilient rings 500 is compressed and generates elastic compression deformation towards the deformation gaps 501 and the hollowed groove 502, the resilient rings 500 are in a stressed state. Since the resilient ring 500 is in the stressed state, it has a restoring force to recover the deformation outwards, which allows the pin 200 to be firmly inserted into the brush body 100 and the inserting block 300, and during the vibration of the vibrating machine core 801, due to the presence of the resilient ring 500, not only the resilient arm 315 is driven to vibrate, but also the entire insert 300 vibrates better with the vibrating machine core 801, so that a better transmission of the vibration can be achieved. The provision of the deformation gap 501 as well as the hollowed groove 502, may improve the elastic deformation capability of the resilient ring 500.

The foregoing description is intended to be merely preferred embodiments of the present disclosure and is not intended to limit the present disclosure, any modifications, equivalents, and improvements within the spirit and principles of the present disclosure are intended to be included within the protection scope of the present disclosure.

The invention claimed is:

1. An electric toothbrush head, characterized by comprising a brush body and an inserting block, wherein an upper part of the brush body is provide with a bristle section on which bristles are provided, a lower part of the brush body is provided with a receiving cavity, the receiving cavity forms a mounting opening on a bottom of the brush body, the inserting block is inserted into the receiving cavity through the mounting opening, an outer sidewall of the inserting block abuts against an inner sidewall of the receiving cavity; the inserting block is provide internally with a machine core channel into which a flat vibrating machine core is inserted, the machine core channel forms an insertion opening on the bottom of the inserting block, the vibrating machine core is inserted into the machine core channel through the insertion opening and abuts against an inner sidewall of the machine core channel; the brush body is provided internally with a pin which is transversely arranged and is penetrated into the receiving cavity, and is inserted in an upper part of the inserting block, the pin fixedly connects the upper part of the inserting block with the brush body; an outer periphery of a bottom of the inserting block extends outwardly to form a bottom abutment ring, the bottom abutment ring is disposed circumferentially along the outer periphery of the inserting block, the bottom abutment ring is located below the brush body and abuts against the bottom of the brush body from bottom up, wherein the brush body is provided internally with a mounting hole which is transversely arranged and communicates with the receiving cavity, the pin is inserted into the mounting hole, an inner end of the pin passes through the mounting hole and extends into the receiving cavity to be inserted into the upper part of the inserting block; a longitudinal step which is longitudinally arranged is formed in a middle of the mounting hole, an outer end of the pin is provided with a tip, the tip is embedded and fixed in the mounting hole, the tip abuts against the longitudinal step, the longitudinal step limits a lateral insertion depth of the pin.

2. The electric toothbrush head according to claim 1, wherein a middle of the inserting block is provide with a notched slot, the notched slot communicates with the machine core channel, a resilient arm which is longitudinally arranged is provided in the notched slot and abuts against the inner sidewall of the receiving cavity; when the vibrating machine core is inserted into the machine core channel, the vibrating machine core abuts against the inner sidewall of the machine core channel, and the resilient arm abuts against the vibrating machine core.

3. The electric toothbrush head according to claim 2, wherein the inserting block comprises a seat body and a insertion shaft disposed on the seat body; the insertion shaft abuts on a top of the seat body, the seat body is integrally formed with the insertion shaft; the machine core channel passes through the seat body and extends to a lower part of the insertion shaft; the notched slot is provided on the insertion shaft and the bottom abutment ring is provided on an outer periphery of a bottom of the seat body; the insertion shaft and the seat body are inserted in the receiving cavity, respectively, an outer sidewall of the insertion shaft and an outer sidewall of the seat body abut against the inner sidewall of the receiving cavity; an upper part of the insertion shaft is solid to form a securing section, an outer sidewall of the securing section abuts against the inner sidewall of the receiving cavity; a pin hole which is transversely arranged is provided in the securing section, the pin hole is laterally aligned with the mounting hole, the pin is inserted and fixed in the pin hole.

4. The electric toothbrush head according to claim 3, wherein an outer periphery of the securing section is provided with a positioning surface which is longitudinally arranged, the positioning surface is planar; the inner sidewall of the receiving cavity comprises a positioning sidewall which is longitudinally arranged, the positioning sidewall is planar, the positioning surface abuts against the positioning sidewall; the pin passes through the positioning sidewall and the positioning surface, respectively.

5. The electric toothbrush head according to claim 3, wherein a lower part of the insertion shaft forms a vibration section, the machine core channel extends into the vibration section, the notched slot is provided in the vibration section; a vibration gap is provide between an outer sidewall of the vibration section and the inner sidewall of the receiving cavity; the seat body comprises a peripheral sidewall which is arranged outwardly, along the direction that the seat body is inserted into the receiving cavity, the peripheral sidewall is inclined inwardly and abuts against the inner sidewall of the receiving cavity.

6. The electric toothbrush head according to claim 2, wherein an upper end of the resilient arm is connected to an inner sidewall of the notched slot, a lower end of the resilient arm extends into the notched slot and is freely arranged; the resilient arm comprises an inner abutment surface facing the machine core channel and an outer abutment surface facing away from the machine core channel, the inner abutment surface abuts against the vibrating machine core, the outer abutment surface abuts against the inner sidewall of the receiving cavity; a transverse groove which is transversely arranged is formed on the vibrating machine core, and the inner abutment surface is convexly provided with a transverse rib which is transversely arranged, the transverse rib is embedded in the transverse groove.

7. The electric toothbrush head according to claim 6, wherein an upper part of the outer abutment surface is recessed towards the machine core channel to form a recess portion, and a lower part of the outer abutment surface is protruded outwardly to form a protruding portion; an upper part of the resilient arm has a thickness less than the thickness of the lower part of the resilient arm, the protruding portion abuts against the inner sidewall of the receiving cavity, a resilient gap is provided between the recess portion and the inner sidewall of the receiving cavity.

8. The electric toothbrush head according to claim 6, wherein a middle of the resilient arm is provided with a interlayer groove which is longitudinally arranged and extends through the lower end of the resilient arm; the interlayer groove is filled with an elastic glue layer, the glue layer fills the entire interlayer groove, the glue layer is in a stressed state in the interlayer groove; the glue layer passes through the resilient arm and extends to the inner abutment surface, to form a resilient surface protruding out of the inner abutment surface; the glue layer is internally provided with a plurality of hollows, and the resilient surface abuts against the vibrating machine core when the vibrating machine core is inserted into the machine core channel, the resilient surface is compressed inwardly to be flush with the inner abutment surface.

9. The electric toothbrush head according to claim 3, wherein a mounting gap is provided between an end portion of the pin and an end portion of the pin hole, a plurality of resilient rings are embedded in an outer sidewall of the pin, the plurality of resilient rings are arranged at intervals along an axial direction of the pin, and are circumferentially arranged along a circumferential direction of the pin; a plurality of mounting grooves are provided in the pin, the plurality of mounting grooves are arranged at intervals along the axial direction of the pin, and are circumferentially arranged along the circumferential direction of the pin; each of the resilient rings is embedded in one mounting groove, a bottom of the resilient ring abuts against a bottom of the mounting groove, and a top of the resilient ring extends out of the mounting groove; a deformation gap is provided between each of two sides of the resilient ring and an inner sidewall of the mounting groove, a middle of the resilient ring is provided with a hollowed groove, the hollowed groove is circumferentially arranged along a circumferential direction of the resilient ring, the hollowed groove extends through the top of the resilient ring; when the pin is inserted into the brush body and the inserting block, the resilient rings are compressed and generate elastic compression deformation towards the deformation gaps and the hollowed groove, the resilient rings are in a stressed state.

* * * * *